United States Patent Office 3,232,699
Patented Feb. 1, 1966

3,232,699
ALKALI METAL DERIVATIVES OF
METAL CARBONYLS
John E. Wyman, Stoneham, Mass., assignor to Union
Carbide Corporation, a corporation of New York
No Drawing. Filed Sept. 12, 1962, Ser. No. 223,254
4 Claims. (Cl. 23—14)

This application is a continuation-in-part of copending application Serial No. 846,773, which has matured into U.S. Patent 3,067,011.

This invention relates to a novel class of metal carbonyl compounds. More particularly, the invention is directed to solid compounds represented by the formula $$LM(CO)_6$$

wherein M is vanadium, niobium, or tantalum, and L is an alkali metal.

Examples of the compounds of this invention are $NaV(CO)_6$, $NaNb(CO)_6$, $NaTa(CO)_6$, $LiV(CO)_6$, $KNb(CO)_6$, $CsTa(CO)_6$, and the like. These compounds can be described as alkali metal salts of the metal carbonyl hydride $HM(CO)_6$, where M has the meaning defined above.

The compounds of this invention are useful as intermediates in the production of metal carbonyls having the empirical formula $[M(CO)_6]_x$, where M has the meaning defined above and $x$ is an integer, including for example, dimetal dodecacarbonyls having the formula $$M_2(CO)_{12}$$

wherein M is vanadium, niobium or tantalum. These dimetal dodecacarbonyls are in turn useful as catalysts in hydroformylation reactions and, in conjunction with trialkyl aluminum compounds, as catalysts for the polymerization of olefins. Because the carbonyls $M_2(CO)_{12}$ decompose at relatively low temperatures to give the free metal and carbon monoxide, they are also useful for the deposition of metal plates on a variety of solid substrates.

For example, divanadium dodecacarbonyl (150 milligrams) was dissolved in 10 milliliters of toluene to give a yellow solution. This solution was added to 250 milliliters of toluene containing 0.4 milliliter of tri-isobutyl aluminum. The resulting mixture was placed in a 500 milliliter dasher-type autoclave and pressurized with ethylene gas to 400 pounds per square inch gauge (p.s.i.g.). The stirred mixture was heated at 40° C. for 28 minutes. After cooling the vessel and venting the excess ethylene, a fibrous polymer of ethylene remained in the toluene. Tri-isobutyl aluminum does not catalyze the polymerization of ethylene in the absence of divanadium dodecarcarbonyl.

A preferred process for preparing the compounds of this invention comprises contacting under reactive conditions, for example by mixing together, the following: (1) an anhydrous halide of vanadium, niobium or tantalum, (2) an alkali metal, preferably sodium in the form of sodium metal dispersion, (3) catalytic quantities of diphenyl, (4) ethylene glycol dimethyl ether solvent and (5) carbon monoxide gas under pressure.

The amount of alkali metal used should preferably be at least enough to reduce the metal in the metal halide to a valence of minus one. That is, if the halide is vanadium trichloride about 4 moles of sodium metal per mole of vanadium trichloride should be used while if the metal halide is tantalum pentabromide about 6 moles of sodium should be employed. The use of a slight stoichiometric excess of sodium above the amount required to reduce the metal to its minus one valence state has been found advantageous.

In the preferred form of the process herein described, the amount of diphenyl may be about 5 mole percent based on the amount of sodium employed. The quantity of ethylene glycol dimethyl ether solvent is not critical but a convenient amount is from 10 to 20 times the weight of metal halide used. The carbon monoxide pressure may be maintained in the range of 500 p.s.i.g. to 1000 p.s.i.g., and a suitable temperature range is between 25° C. and 70° C.

In carrying out the process, the metal halide, sodium, diphenyl and ether solvent may conveniently be combined in a suitable pressure vessel with the exclusion of air and moisture. In a preferred embodiment of the process, the sodium metal, in the form of sodium dispersion in an inert solvent, is sealed in glass ampoules and placed in the pressure vessel. This allows the vessel to be pressurized with carbon monoxide before the sodium and metal halide come in contact. The vessel may then be pressurized with dry carbon monoxide and the ampoules broken by rocking. The resulting reactant mixture is then maintained at 25° C. to 70° C. for 15 to 20 hours. Under these conditions there results or is produced the sodium salt of vanadium, niobium or tantalum carbonyl hydride.

The resulting reaction mixture containing the sodium salt of the carbonyl hydride may then be filtered to remove solid material and the filtrate evaporated to dryness under reduced pressure, thus isolating the solid compound $NaM(CO)_6$.

If the alkali metal employed is potassium or lithium, the corresponding potassium or lithium salts are produced. That is, there results a compound having the formula $LM(CO)_6$ wherein M represents vanadium, niobium or tantalum and L represents an alkali metal.

When it is desired to convert the compound $LM(CO)_6$ to the corresponding carbonyl $M_2(CO)_{12}$, aqueous acid is added to the residue from the evaporation of the solvent and there results, or is produced, the dimetal dodecacarbonyl. The dimetal dodecacarbonyl may then be extracted from the aqueous acid by means of a water-immiscible organic solvent in which the carbonyl is soluble, such as toluene or petroleum ether, and subsequently recovered from the organic solvent by evaporation of the solvent or by crystallizing the carbonyl from the solution at low temperatures. The resulting crystalline carbonyl product may be further purified by sublimation if desired.

The preparation of the compounds $LM(CO)_6$ is illustrated by the following example. In a dry box under an atmosphere of dry nitrogen 14.54 grams (0.05 mole) of vanadium tribromide, 3.31 grams (0.022 mole) of diphenyl and 200 milliliters of dry ethylene glycol dimethyl ether were placed in a 500 milliliter stainless steel pressure vessel containing three stainless steel balls ½ inch in diameter. Two sealed glass ampoules containing a total of 12.67 grams of 40 percent sodium dispersion in toluene (0.22 mole of sodium metal) were then added and the pressure vessel was closed. The vessel was then placed in a rocking furnace and carbon monoxide was introduced to a final pressure of 850 pounds per square inch gauge (p.s.i.g.) at 28° C. The temperature rose to 30° C. The rocker was then turned on and the pressure dropped to 740 p.s.i.g. at 26° C. over a 20 minute period. The vessel was then heated to 35° C. over a 15 minute period the pressure rising to 750 p.s.i.g. The pressure then dropped steadily to 660 p.s.i.g. over a one hour period the temperature falling to 32° C. during this time. The reaction mixture was maintained under these latter conditions for about 17 hours.

At the end of this time the pressure in the vessel had dropped to 500 p.s.i.g. at 25° C. corresponding to a total pressure drop of 240 p.s.i.g. The excess pressure was then vented and the product recovered in a dry box under a nitrogen atmosphere in subdued light. The contents of the pressure vessel were filtered and the resulting solution evaporated to dryness under reduced pressure. The yellow residue, consisted primarily of sodium vanadium hexacarbonyl, $NaV(CO)_6$.

The sodium vanadium hexacarbonyl was then dissolved in 200 milliliters of distilled water, filtered and acidified with 20 milliliters of cold 50 percent sulphuric acid. The resulting aqueous solution was extracted with three 100 milliliter portions of toluene and the extracts were cooled separately in a carbon dioxide-acetone bath. The blue crystalline divanadium dodecacarbonyl which precipitated in the cold bath was recovered by filtration.

For the preparation of $NaNb(CO)_6$ and $Nb_2(CO)_{12}$, a suitable reaction mixture contains anhydrous $NbBr_5$, about 6 moles of sodium per mole of $NbBr_5$, diphenyl, ether solvent and carbon monoxide. A similar reaction mixture suitable for the production of $NaTa(CO)_6$ and $Ta_2(CO)_{12}$ contains anhydrous $TaCl_5$ in place of $NbBr_5$. The reaction conditions and methods of recovery of the desired products are similar to those described in detail for $NaV(CO)_6$ and $V_2(CO)_{12}$.

What is claimed is:

1. The reaction product obtained by (a) reacting (1) an anhydrous halide of a metal selected from the group consisting of vanadium, niobium, and tantalum, (2) a sufficient amount of an alkali metal to at least reduce the metal in the metal halide to a valence of minus one, (3) a catalytic quantity of diphenyl, (4) ethylene glycol dimethyl ether solvent, and (5) carbon monoxide gas under pressure, (b) filtering the reaction mixture, and (c) evaporating the filtrate to dryness.

2. The reaction product obtained by (a) reacting (1) an anhydrous halide of vanadium, (2) a sufficient amount of sodium to at least reduce the vanadium in the vanadium halide to a valence of minus one, (3) a catalytic quantity of diphenyl, (4) ethylene glycol dimethyl ether solvent, and (5) carbon monoxide gas under pressure, (b) filtering the reaction mixture, and (c) evaporating the filtrate to dryness.

3. The reaction product obtained by (a) reacting (1) an anhydrous halide of niobium, (2) a sufficient amount of sodium to at least reduce the niobium in the niobium halide to a valence of minus one, (3) a catalytic quantity of diphenyl, (4) ethylene glycol dimethyl ether solvent, and (5) carbon monoxide gas under pressure, (b) filtering the reaction mixture, and (c) evaporating the filtrate to dryness.

4. The reaction product obtained by (a) reacting (1) an anhydrous halide of tantalum, (2) a sufficient amount of sodium to at least reduce the tantalum in the halide to a valence of minus one, (3) a catalytic quantity of diphenyl, (4) ethylene glycol dimethyl ether solvent, and (5) carbon monoxide gas under pressure, (b) filtering the reaction mixture, and (c) evaporating the filtrate to dryness.

References Cited by the Examiner
FOREIGN PATENTS 609,886   10/1960   Italy.

OTHER REFERENCES

Werner et al.: "Chemistry and Industry," pages 144–145, (Feb. 4, 1961).

MAURICE A. BRINDISI, *Primary Examiner.*